US007222696B2

(12) United States Patent
Jackson

(10) Patent No.: US 7,222,696 B2
(45) Date of Patent: May 29, 2007

(54) INDEPENDENTLY ADJUSTABLE EXTENSIONS FOR LEVELING A LADDER

(76) Inventor: Elizabeth Jackson, 173 Black Mountain Rd., Cullowhee, NC (US) 28723

( * ) Notice: Subject to any disclaimer, the term of this patent is extended or adjusted under 35 U.S.C. 154(b) by 0 days.

(21) Appl. No.: 11/436,179

(22) Filed: May 18, 2006

(65) Prior Publication Data

US 2006/0201746 A1 Sep. 14, 2006

Related U.S. Application Data

(63) Continuation-in-part of application No. 10/959,877, filed on Oct. 7, 2004, now Pat. No. 7,121,382.

(51) Int. Cl.
*E06C 1/00* (2006.01)
*E06C 7/00* (2006.01)
*F16B 21/00* (2006.01)

(52) U.S. Cl. ....................... 182/204; 182/201; 411/347

(58) Field of Classification Search ................ 182/200, 182/201, 206, 204, 202, 107, 203, 205, 214; 248/188.2, 188.5; 411/348, 508, 21, 22, 411/347, 509, 510; 24/457, 458, 326, 356, 24/100

See application file for complete search history.

(56) References Cited

U.S. PATENT DOCUMENTS 3,097,559 A * 7/1963 Chapman .................... 411/348
3,414,082 A 12/1968 Gilland
3,937,298 A 2/1976 Hurwitz
3,948,352 A 4/1976 Larson et al.
4,143,742 A 3/1979 Fernandez
4,606,432 A 8/1986 Belt
4,671,383 A 6/1987 Huang
5,305,851 A 4/1994 Katson et al.
5,307,900 A 5/1994 Noga
5,476,153 A 12/1995 Dickerson et al.
5,497,850 A 3/1996 Patterson
5,853,065 A 12/1998 Hutson et al.
5,908,085 A 6/1999 Lovelady
6,012,546 A 1/2000 Bee et al.
6,073,726 A 6/2000 McCrystal
6,478,113 B1 11/2002 Ellison
6,779,632 B1 8/2004 Parks, III

* cited by examiner

*Primary Examiner*—Hugh B. Thompson, II
(74) *Attorney, Agent, or Firm*—Theresa M. Seal

(57) ABSTRACT

Independently adjustable ladder extensions for use with folding, step, or extension ladders includes at least one pair of adjustable support legs slidably disposed within the channels of the side rails and having apertures that align with through holes on the side rails so that the support legs can be slidably adjusted within the channels and then locked in the desired position for stabilizing and leveling the ladder on an uneven surface. Locking pins insert into the through holes of the side rails and through the apertures of the support legs for locking the support legs in the position, and the locking pins include a flap member for holding the locking pins in position. A traction foot is pivotally mounted to a base member located at the lower end of each leg to facilitate ladder stabilization on uneven surface, and each traction foot is independently rotatably adjustable on the base member in parallel or sideways orientation relative to the sidewall of the structure while an extension member terminating with an eave catch is slidably disposed within the upper end of each side rail for supporting the ladder against a pitched roof.

13 Claims, 7 Drawing Sheets

INDEPENDENTLY ADJUSTABLE EXTENSIONS FOR LEVELING A LADDER

The present application is a continuation-in-part application of application Ser. No. 10/959,877 filed on Oct. 7, 2004, now U.S. Pat. No. 7,121,382.

FIELD OF THE INVENTION

The present invention pertains to ladder accessories and attachments for safely deploying a ladder, and more particularly pertains to independently adjustable extensions for leveling a ladder on sloping, uneven or irregular surfaces.

BACKGROUND OF THE INVENTION

One of the most common pieces of equipment for both household and work use is the ladder in its several embodiments: the extension ladder and the stepladder. Such ladders are used for tasks as diverse as painting, cleaning aluminum siding, cleaning gutters, changing lights and cleaning ceiling fans and stocking shelves. Since the work sites where such ladders are used are often irregular, uneven or sloping, care must be taken in properly setting up and deploying the ladders. Obviously placing a ladder on an uneven or irregular surface decreases the stability of the ladder; and this instability increases with the height or vertical extension of the ladder. Moreover, with the current issues of worker's compensation and personal injury liability, the improper deployment of a ladder by an employee can result in a physical injury for the employee and the possibility of legal damages and penalties against the employer for improper supervision of the work site.

Thus, in order to stabilize a ladder on an uneven or irregular surface the homeowner and employee resort to several common expedients. One expedient is to simply find a handy and available rock to wedge under the lowermost end of one of the side rails of the ladder to balance and level the ladder. Another expedient is to use shims, spacers or boards to level the ladder. However, in both cases the leveling is rough and approximate, and if the ladders needs repositioned, the leveling process must be undertaken anew. In addition, there is also an initial investment of time in searching for such spacers and levelers. And perhaps most importantly, such shims and spacers are not secured to the lower end of the ladder side rails, with the possibility of the ladder slipping off the shim or spacer with the individual falling off the ladder and sustaining serious injury.

The prior art discloses a wide variety of attachments and accessories for leveling and stabilizing ladders 9 on uneven and irregular terrain, surfaces and ground.

The Gilland patent (U.S. Pat. No. 3,414,082) discloses a ladder leveling apparatus that includes extensible mounting members that are pivotally attached to the side rails of the ladder.

The Hurwitz patent (U.S. Pat. No. 3,937,298) discloses a ladder leveling attachment that includes a transverse member attachable to the lower end of the ladder side rails, with the transverse member having opposed sockets for receiving therein adjustable legs for leveling the ladder.

The Larson et al. patent (U.S. Pat. No. 3,948,352) discloses a ladder leveler for extension ladders that includes a pair of sleeves each of which encompasses the lower end of the ladder side rails and is vertically adjustable and locks into place by a spring-biased pin.

The Fernandez patent (U.S. Pat. No. 4,143,742) discloses a ladder extension that includes a pair of l-shaped members that are bolted to each ladder side rail and are vertically adjustable along the lower portion of each side rail.

The Belt patent (U.S. Pat. No. 4,606,432) discloses an adjustable ladder leg that includes adjustable legs that are attached to each side rail by a clamping member and are slidably adjustable within channels that are also mounted to the clamping members.

The Huang patent (U.S. Pat. No. 4,671,383) discloses a ladder leveler that includes a pair of interconnected adaptors with each adaptor mounted to the bottom of each side rail, and an adjustable leg affixed to the underside of each adaptor for leveling the ladder.

The Katson et al. patent (U.S. Pat. No. 5,305,851) discloses an adjustable ladder leg for both a stepladder and an extension ladder.

The Dickerson et al. patent (U.S. Pat. No. 5,476,153) discloses a ladder leveling apparatus that includes a vertical support externally mounted to the lower end of each ladder side rail with each vertical support adjustable on the side rail and locked into place by a manually operable tightening member.

The Lovelady patent (U.S. Pat. No. 5,908,085) discloses a ladder leveling system that includes a pair of bands mounted to the lower end of each ladder rail for supporting a leg extension, and the leg extensions are interconnected for adjustment therealong by a spring loaded handle that extends between the ladder rails.

The McCrystal patent (U.S. Pat. No. 6,073,726) discloses an adjustable stepladder having adjustable legs and adjustable steps affixed to at least one pair of the side rails for leveling the ladder.

Nonetheless, despite the ingenuity of the above devices, there remains a need for a ladder leveling apparatus that is easily and quickly adjustable for leveling a ladder and is not cumbersome in use or weight when added to the ladder.

SUMMARY OF THE INVENTION

The present invention comprehends independently adjustable ladder extensions for achieving the stable, safe and level disposition of a ladder on uneven, irregular, sloping or inclined surfaces. The independently adjustable ladder extensions provide for the more flexible accommodation of the ladder on all types of uneven or irregular surfaces.

The adjustable ladder extensions include at least one pair of ladder extensions with each ladder extension including a support leg for insertion within the channel of the side rail adjacent the lower end thereof so that the side rail encompasses the support leg. Each support leg includes a plurality of apertures and the apertures align with through holes on the side rail. Each support leg can be slid and adjusted within the channel of the side rail independent of the slidable movement and positioning of the other support leg for stable placement of the ladder on the uneven ground. After the desired position for each support leg is obtained, with the apertures of the support leg aligned with the through holes of the side rail, a locking pin is inserted through the side rail and the support leg for locking the support leg in that position. Pivotally mounted to at the lower end of each support leg is a traction foot for gripping the ground to facilitate the stable and secure disposition of the ladder. In order to further facilitate the level deployment of the ladder on the uneven or irregular surface, a level is integrally affixed to at least one ladder rung. The level further assists the individual in appropriately adjusting each ladder extension to obtain a level disposition of the ladder relative to the uneven or irregular surface.

It is an objective of the present invention to provide ladder extensions for a ladder that are independently adjustable for safely setting up the ladder on uneven, irregular surfaces.

It is another objective of the present invention to provide ladder extensions that are independently adjustable for leveling a ladder and are easily adjustable by only one individual without requiring the assistance of others.

It is yet another objective of the present invention to provide ladder extensions that are independently adjustable and that include an integral level affixed to at least one ladder rung of the ladder for guiding the individual during ladder adjustment so that the level disposition of the ladder can be obtained.

It is still yet another objective of the present invention to provide ladder extensions that can be quickly and easily adjusted independent of each other to ensure a stable, secure disposition of the ladder on the particular sloping, uneven or irregular ground surface.

Still yet another objective of the present invention is to provide independently adjustable ladder extensions for a ladder that obviates the need to use shims, spacers or wedges beneath the bottom ends of the side rails to level the ladder.

A still further objective of the present invention is to provide independently adjustable ladder extensions for a ladder wherein the ladder extensions can be easily and quickly locked into place when the desired position for each ladder extension is obtained, and then can be quickly unlocked for further adjustment should the ladder be repositioned at another location.

These and other objects, features and advantages will become apparent to one skilled in the art upon a perusal of the following detailed description when read in conjunction with the accompanying drawing figures.

DETAILED DESRCIPTION OF THE PREFERRED EMBODIMENT

Illustrated in FIG. 1-12 are several embodiments for independently adjustable ladder extensions 10 for leveling and stabilizing ladders on uneven, irregular, sloping and inclined surfaces and that eliminates the need for using wedges, shims and spacers to level the ladder. The adjustable extensions 10 can be used with various ladder designs, such as stepladders and extension ladders, so that two adjustable extensions 10 would be used with an extension ladder while four adjustable extensions 10 would be used with a typical foldout stepladder. The extensions 10 are preferably manufactured from aluminum and are independently adjustable up to 12 inches.

Figure 1:
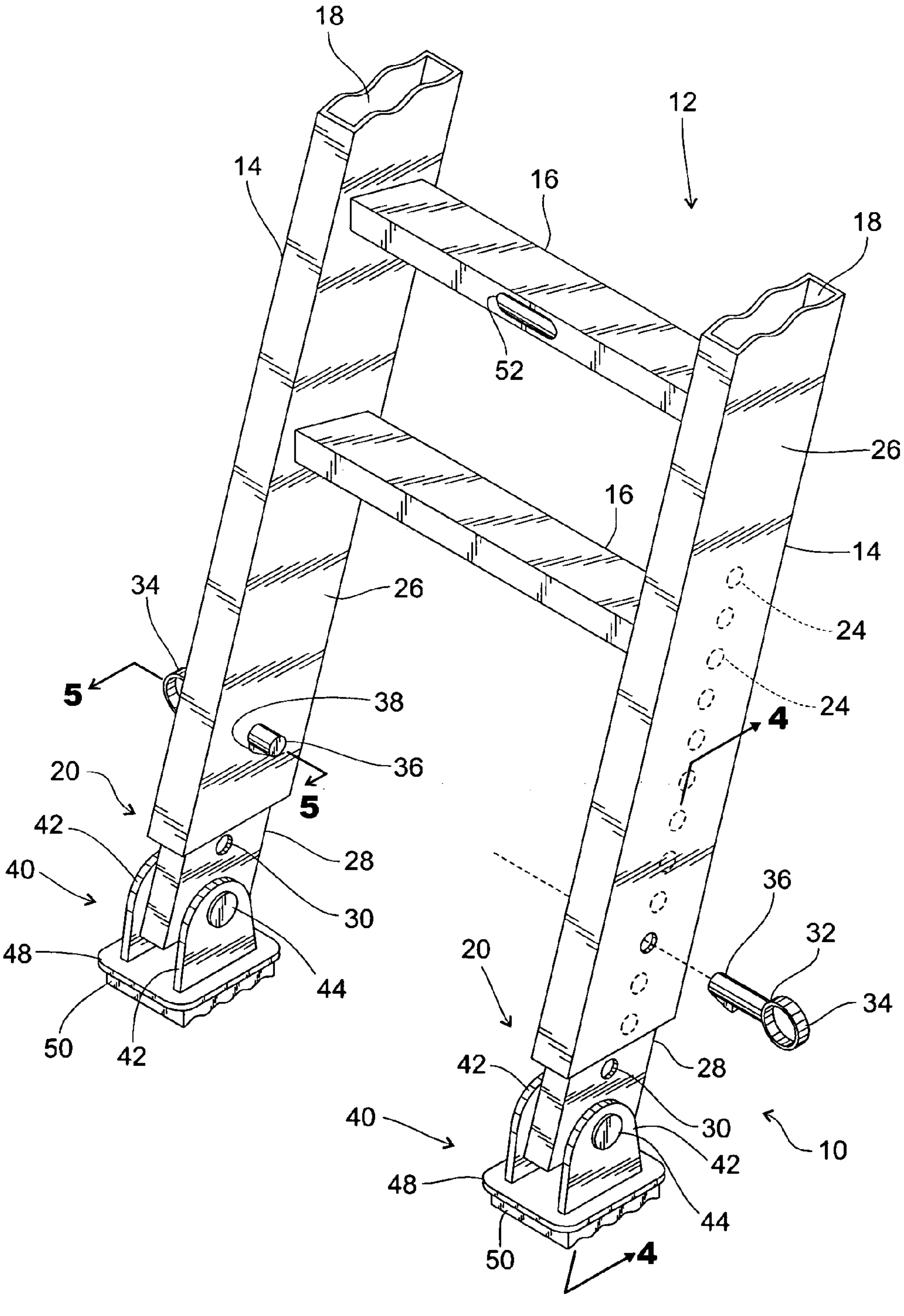
FIG. 1 is a perspective view of the independently adjustable ladder extensions of the present invention showing their mounting at the lower ends of the ladder side rails.
Figure 2:
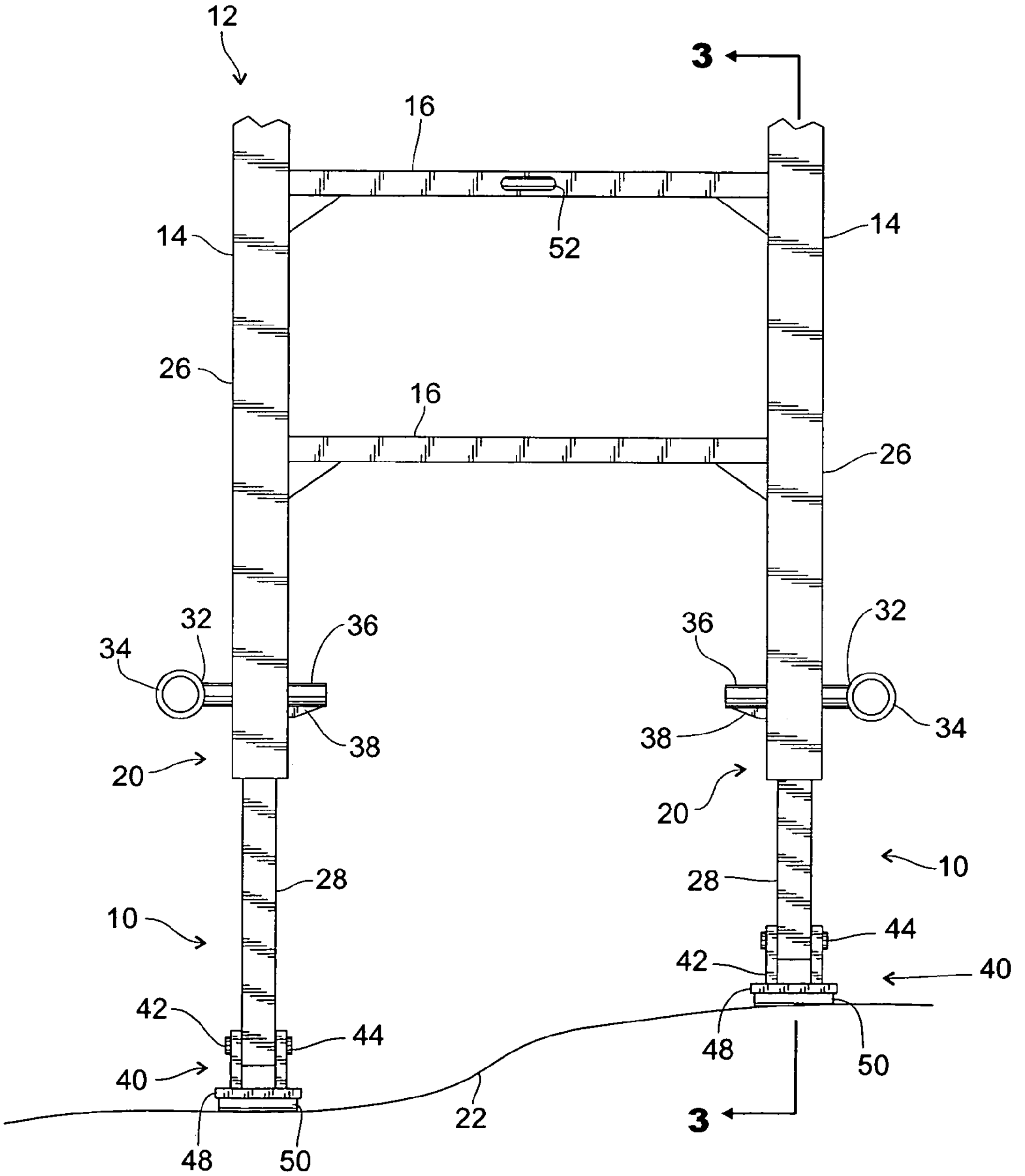
FIG. 2 is a front elevational view of the independently adjustable ladder extensions illustrating the various adjustment positions of each ladder extension for leveling the ladder on uneven ground.

Thus, with reference to FIGS. 1 and 2, the adjustable ladder extensions 10 are used with a representative extension ladder 12 that includes a pair of opposed ladder stiles or side rails 14 interconnected by several ladder rungs 16. Each side rail 14 defines and interior channel 18 that extends the length of the side rail 14, and each side rail 14 includes a bottom or lower end 20 that would normally (without the employment of the ladder extensions 10) contact and rest against the ground surface 22, such as the uneven, sloping surface of FIG. 2. Adjacent the lower end 20 of each side rail 14 is a plurality of equidistantly spaced through holes 24 that extend through each sidewall 26 of each side rail 14. Preferably the through holes 24 are spaced either three quarters of an inch or one inch apart.

Figure 3:
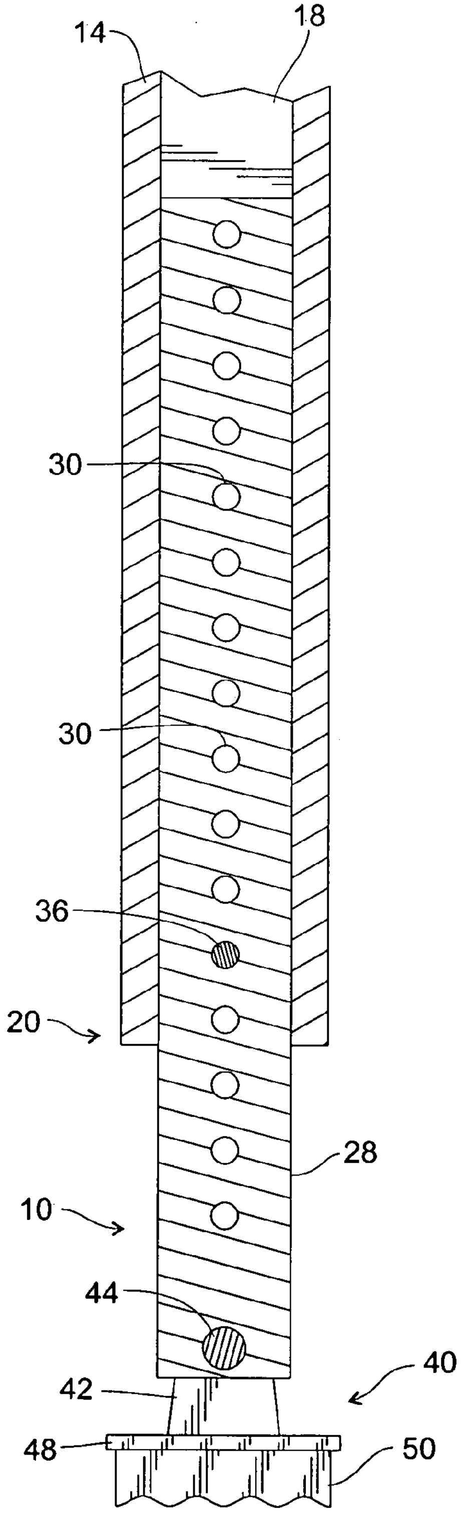
FIG. 3 is a sectioned elevational view taken along lines 3-3 of FIG. 2 of the independently adjustable ladder extensions illustrating the disposition of one ladder extension within the lower end of one ladder side rail.

As shown in FIGS. 1-4, each ladder extension 10 includes an elongated support or extension leg 28. The support legs 28 are inserted within the channels 18 of the side rails 14 and are encompassed by the side rails 14 for slidable adjustable movement therein. As shown in FIG. 3 each support leg 28 includes a plurality of apertures 30 equidistantly spaced from each other either at three quarters of an inch or one inch; this spacing provides for the alignment of the through holes 24 of the side rails 14 with the apertures 30 of the support leg 28 during the adjustment of each support leg 28. The support legs 28 are adapted for independent slidable telescopic movement up and down within the respective side rails 14 so that the appropriate height for each leg 28 can be obtained for achieving the stable and level disposition of the ladder 12 on the uneven and irregular ground surface 22.

Figure 4:
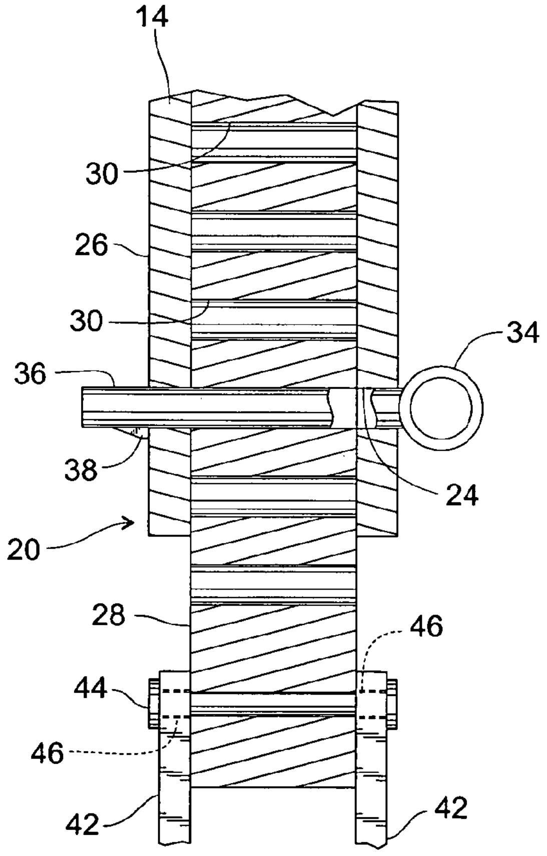
FIG. 4 is a sectioned elevational view taken along lines 4-4 of FIG. 1 of the independently adjustable ladder extensions illustrating the insertion of the locking pin through the side rail and the ladder extension for locking the ladder extension in place to the side rail.
Figure 5:
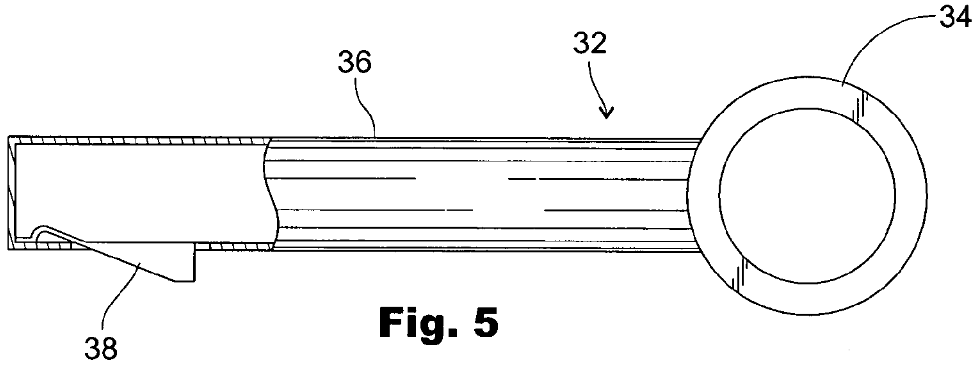
FIG. 5 is a front elevational view of the independently adjustable ladder extensions illustrating the flap member of the locking pin disposed in the locking position for locking the ladder extension to the lower end of the side rail.
Figure 6:
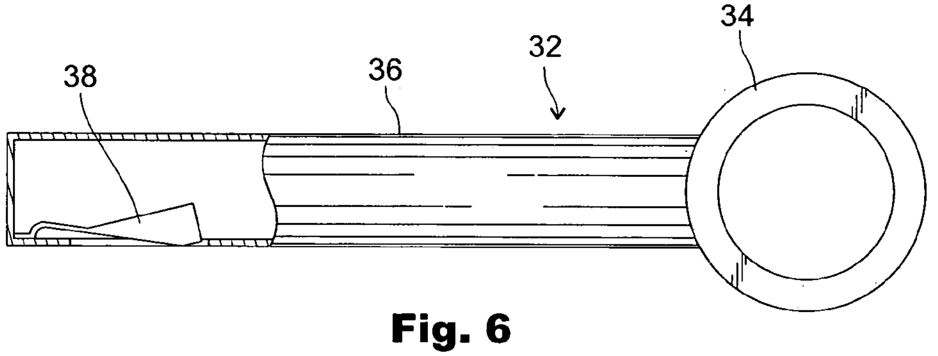
FIG. 6 is a front elevational view of the independently adjustable ladder extensions illustrating the disposition of the flap member of the locking pin during the insertion or withdrawal of the locking pin to or from the side rail and the ladder extension.
Figure 7:
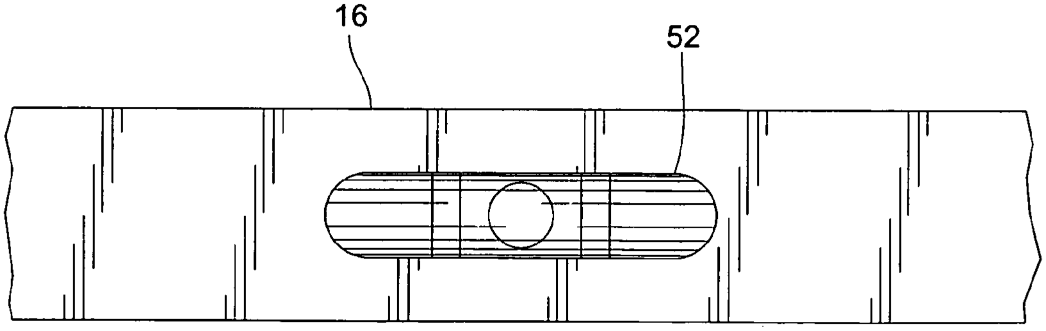
FIG. 7 is a front elevational view of the independently adjustable ladder extensions illustrating a level integrally mounted to one ladder rung of the ladder.

As shown in FIGS. 1, 2 and 4-7, a locking means is used to lock the ladder extensions 10 in position after they have been slidably adjusted within the channels 18 of the side rails 14 and set at the desired height for leveling the ladder 12. The locking means includes one locking or cotter pin 32 for each ladder extension 10 as shown in FIG. 2. The locking pin 32 has a ring member 34 for manually gripping by the individual's finger and a shaft 36 having sufficient length to extend completely through the ladder extension 10 and the side rail 14. At the end of the shaft 36 is a stop or flap member 38 that can be of flexible spring steel. In order to insert the locking pin 32 through the side rail 14 and the ladder extension 10 disposed therein, the flap member 38 is bent backward so that the shaft 36 of the locking pin 32 can be cleanly inserted through the aligned aperture 30 and through hole 24; and after the shaft 36 passes through the respective through hole 24 and aperture 30, the flap member 38 can be returned to its normal position, as shown in FIGS. 1, 2 and 4, thereby preventing the accidental withdrawal of the locking pin 32 from the side rail 14. In order to purposely remove the locking pin 32, the flap member 38 is deliberately pressed against the shaft 36 so that the locking pin 32 can be withdrawn and removed from the side rail 14.

As shown in FIGS. 1-4, to insure the non-slidable disposition of the ladder 12 on the particular surface 22 after the appropriate adjustment of each ladder extension 10, pivotally mounted to the lowermost end of each support leg 28 is a surface gripping traction foot 40. Each traction foot 40 includes a pair of spaced-apart brackets 42 that abut the opposite sides of the lowermost end of the support leg 28, and a dowel or pivot pin 44 is inserted through bracket apertures 46 and the lowest aperture 30 of the support leg 28 thereby pivotally mounting the traction foot 40 to the lowermost end of the support leg 28. The brackets 42 extend upwardly from a main plate 48, and attached to the underside of the main plate 48 is a rubberized, irregular, undulating, non-skid traction pad 50.

In order to assist the individual in leveling and stabilizing the ladder 12 during the process of adjusting and positioning of the ladder extensions 10 with respect to each other and the ground surface 22, at least one level 52 is integrally affixed to one ladder rung 16. This allows the individual to use the level 52 to determine when the proper level disposition of the ladder 12 has been attained, instead of having to continually step back from the ladder 12 to visually observe the positions of the side rails 14 or the upper step of the ladder (for a foldout stepladder) to decide if the ladder 12 is properly leveled.

By way of example, for leveling the ladder 12 on the uneven ground surface 22 illustrated in FIG. 2, the individual would first slide one ladder extension 10 within the side rail 14 and then insert the locking pin 32 for locking that support leg 28 to the side rail 14. Then the other ladder extension 12 would be slidably adjusted in the other side rail 14 to the appropriate height and then locked in position by insertion of the locking pin 32. The individual would check the level 52 and then adjust one or both of the ladder extensions 10 by sliding the respective support leg 28 up or down in the side rail 14 until the appropriate height for each ladder extension 10 is found for obtaining the level and stable disposition of the ladder 12 upon the ground surface 22.

Figure 8:
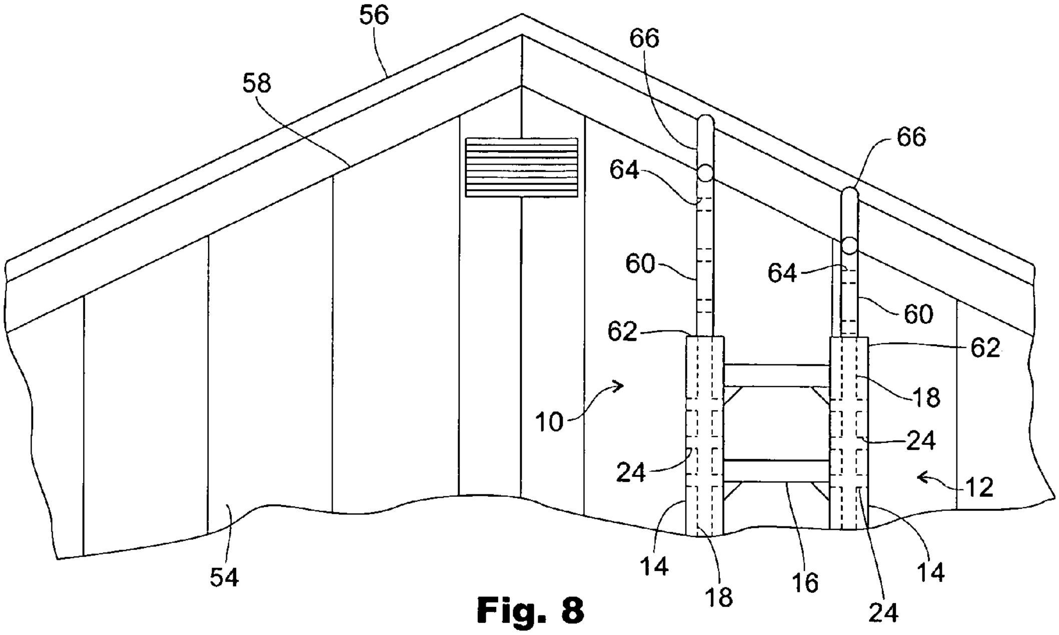
FIG. 8 is an elevational view of the independently adjustable ladder extensions illustrating an alternative embodiment for supporting the upper ends of the respective support legs against a pitched roof.
Figure 9:
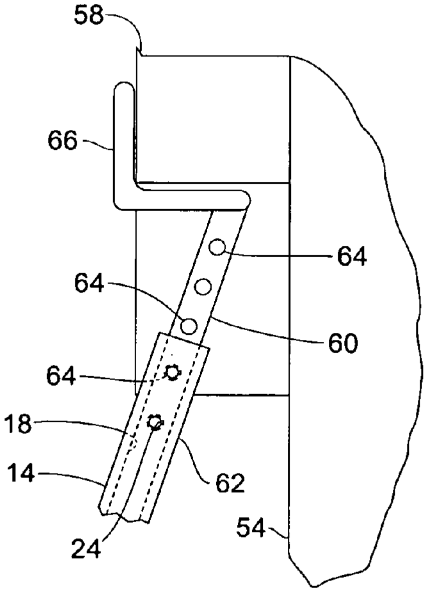
FIG. 9 is a side elevational view of the independently adjustable ladder extensions illustrating the disposition of one eave catch with respect to the exterior surface of the pitched roof.

Illustrated in FIGS. 8-13 are several embodiments for enhancing the supporting and stabilizing capability of the ladder extensions 10, and for further stabilizing the ladder 12 on uneven or irregular terrain. Specifically, illustrated in FIG. 8 is a sidewall or end wall 54 of a structure with the structure including a representative pitched roof 56 at the standard pitch and an eave 58 coextensive with the pitched roof 56. The ladder 12 includes an independently adjustable supporting means to support the side rails 14 on or against the pitched roof 56, and to stabilize the ladder 12 when being deployed adjacent the eave 58 of the pitched roof 56. The independently adjustable support means specifically shown in FIGS. 8 and 9 includes a pair of elongate extension members 60 with each extension member 60 disposed within the channel 18 of the respective side rail 14 at the upper end 62 of each side rail 14. Each extension member 60 is disposed within the respective channel 18 for slidable adjustable up or down movement therein. Furthermore, each extension member 60 includes a plurality of extension member apertures 64 spaced along the length of the extension member 60. The extension member apertures 64 are spaced to align with the equidistantly spaced through holes 24 that are located along the upper end 62 of each side rail 14. Each extension member 60 also includes an l-shaped eave catch 66 for engaging the eave 58 and thereby additionally supporting the ladder 12 in its angled extension adjacent the sidewall 54 of the structure. As shown in FIGS. 8 and 9, the extension members 60 are selectively and independently adjustable relative to each other to accommodate the pitch of the roof 56 and the eave 58. After each extension member 60 has been appropriately adjusted in a slidable, longitudinal direction relative to the side rail 14 in which it is disposed, a locking pin, such as the locking pin 32, is inserted through the aligned through holes 24 and extension member apertures 64 thereby locking the extension members 60 in position so that the eave catches 66 can be brought into engagement with the eave 58 of the structure. It should be noted that the slidable movement of the support legs 28 within the channels 18 adjacent the lower ends 20 of the side rails 14 will not interfere with the slidable adjustable movement of the extension members 60 within the channels 18 at the upper ends 62 of the side rails 14.

Figure 10:
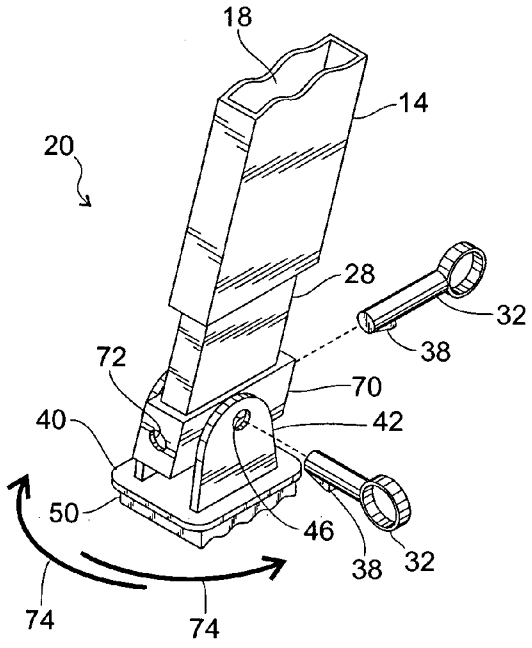
FIG. 10 is a perspective view of the independently adjustable ladder extensions illustrating an alternative embodiment for adjusting and rotating the traction foot at the lowermost end of one support leg for accommodating the extension ladder on uneven or irregular terrain.
Figure 11:
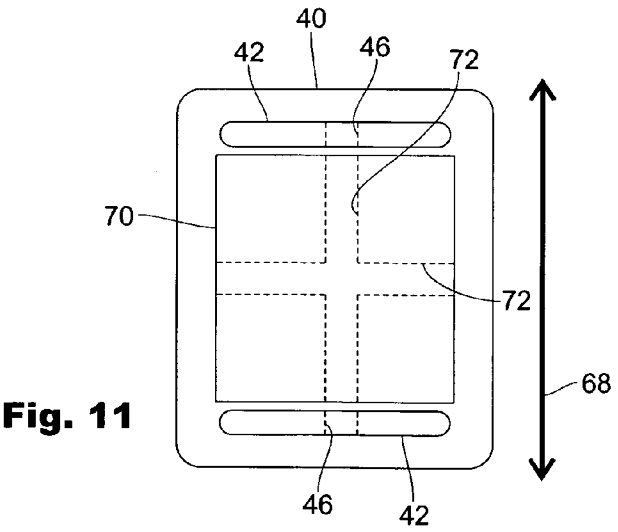
FIG. 11 is a top plan view of the independently adjustable ladder extensions illustrating one rotatable orientation of the traction foot mounted to the lowermost end of one support leg.
Figure 12:
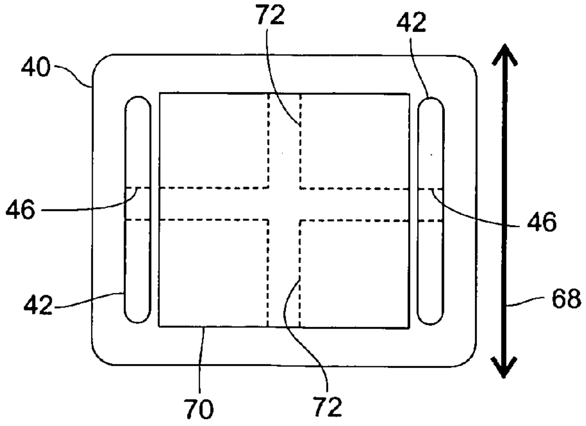
FIG. 12 is a top plan view of the independently adjustable ladder extensions illustrating a second rotatable orientation of the traction foot mounted to the lowermost end of one support leg.

Illustrated in FIGS. 10-13 is an alternative embodiment for adjustably mounting the foot 40 to the lowermost end 20 of each support leg 28 for further enhancing the stabilizing capacity of the ladder 12 on uneven or irregular terrain or ground surface. Each foot 40 can thus be mounted parallel with respect to the sidewall 54 of the structure or can be turned for sideways mounting to the support leg 28 with the foot 40 thereby oriented perpendicular to the sidewall 54 of the structure. FIGS. 11 and 12 include longitudinal lines 68 that illustrate the parallel orientation of the foot 40 (FIG. 11) relative to the sidewall 54, and the sideways or perpendicular orientation (FIG. 12) of the foot 40 relative to the sidewall 54. Thus, the lowermost ends 20 of the support legs 28 have been modified so that a square-shaped base member 70 can be mounted thereto. The base member 70 includes a pair of base through holes 72 that extend at right angles to each other and extend completely through the interior of the base member 70. The base through holes 72 intersect each other within the interior middle of the base member 70 and align with the bracket apertures 46 of the brackets 42 so that a pin, such as locking pin 32, can be inserted through the bracket apertures 46 and base through holes 72 for locking the foot 40 onto the base member 70.

Figure 13:
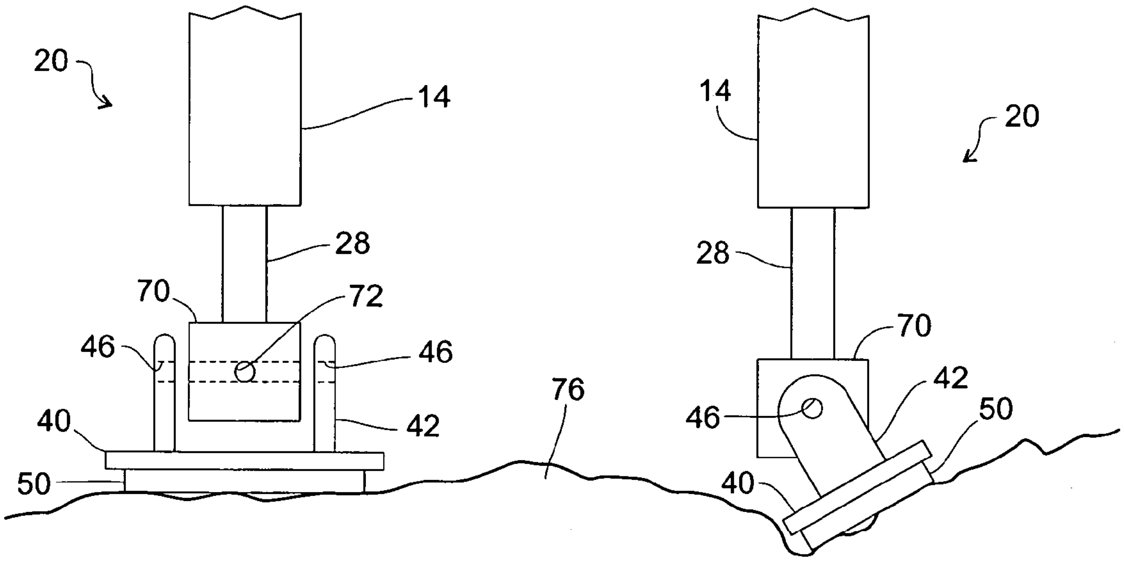
FIG. 13 is an elevational view of the independently adjustable ladder extensions illustrating the separate dispositions and angled orientations of each traction foot mounted to the lower end of each support leg for stabilizing the ladder on an uneven surface.

As shown in FIG. 10 in order to adjust the foot 40 from parallel to sideways securement to the base member 70 at the lower end 20 of the support leg 28, the foot 40 is rotated 45 degrees in either the clockwise direction or counterclockwise direction as shown by the respective directional arrows 74. As shown in FIG. 10 when the foot 40 is mounted in the parallel orientation, the locking pins 32 can be inserted through the brackets 42 and the base member 70 from either side of either bracket 42; when the foot 40 is mounted sideways or perpendicular to the sidewall 54, the locking pin 32 can be inserted through the brackets 42 and the base member 70 from either the front to back or the back to front. It should be noted that each foot 40 is independently adjustable relative to the other foot 40, so that if circumstances warrant it, one foot 40 can be secured to the base member 70 in the parallel orientation and the other foot 40 can be secured to the base member 70 in the sideways or perpendicular orientation. This is shown in FIG. 13 where the foot 40 mounted to the base member 70 of the left side rail 14 is disposed in the parallel orientation with respect to the sidewall 54, and the foot 40 mounted to the base member 70 of the right side rail 14 is disposed in the sideways or perpendicular orientation with respect to the sidewall 54. (The locking pins 32 have been omitted from FIG. 13 for clarity.) Also, one preferred dimension for the traction foot 40 is a width of three inches and a length of six inches. The traction feet 40 shown in FIG. 13 include this dimension.

Thus, the embodiments illustrated in FIGS. 10-13 provide for the rotation and adjustable mounting of the foot 40 to the base member 70 in two orientations—parallel and sideways—as well as the pivotal mounting of the foot 40 to the base member 70 so that the foot 40 is able to pivot front to back (or vice versa), and left to right (or vice versa). This allows for the safe and stationary deployment of the ladder 12 on any irregular or uneven terrain or ground surface, such as the ground surface 76 shown in FIG. 13, thereby obtaining maximum stabilization on the ground surface 76 for safely using the ladder 12.

It is to be understood that the present disclosure pertains to a preferred embodiment of the invention and is for illustrative purposes only in so far as numerous modifications, alterations, and variations may be both possible and practicable to those skilled in the art without departing from the spirit of the invention or the scope of the appended claims.

I claim:

1. A pair of independently adjustable ladder extensions for leveling a ladder on a ground surface with the ladder having opposed side rails and each side rail having a channel, a plurality of through holes and a plurality of rungs interconnecting the side rails, each ladder extension, comprising:

a support leg disposed within the channel of the respective side rail for slidable adjustable movement therein, and the movement of one support leg being independent of the slidable movement of the other support leg;

locking means for locking the support leg in position after slidable adjustment within the respective channel and for releasing the support leg so that the support leg can be readjusted and repositioned within the respective channel of the side rail;

the locking means including a locking pin for insertion into and through the side rail and the support leg for locking the support leg in position and for removal therefrom so that the support leg can be readjusted and repositioned;

the locking pin including a shaft and a bendable flap member attached to the shaft and which is pressed against the shaft for facilitating the insertion and removal of the locking pin; and whereupon after the support leg is adjusted and positioned within the channel of the side rail the flap member is pressed against the shaft to allow for the insertion of the locking pin into and through the side rail and support leg and then the flap member is bent away from the shaft for preventing the withdrawal of the locking pin from the support leg and side rail resulting in the support leg being locked in position to the side rail.

2. The independently adjustable ladder extensions of claim 1 wherein each side rail includes an upper end and an opposite lower end.

3. The independently adjustable ladder extensions of claim 2 wherein each support leg projects from the respective lower end of each side rail for engaging the ground surface.

4. The independently adjustable ladder extensions of claim 3 further comprising a pair of base members with each base member mounted to each support member and each base member including one pair of base through holes that extend completely through the base member at right angles to each other.

5. The independently adjustable ladder extensions of claim 4 further comprising a pair of traction feet with each traction foot pivotally and rotatably mountable to each respective base member for stabilizing and leveling the ladder on the ground surface.

6. The independently adjustable ladder extensions of claim 5 wherein each traction foot includes a gripping pad for contacting the ground surface and preventing the ladder from slipping on the ground surface.

7. The independently adjustable ladder extensions of claim 6 wherein each traction foot includes a pair of spaced-apart brackets between which the base member is positioned for securing the traction foot to the respective base member.

8. The independently adjustable ladder extensions of claim 7 further comprising a pair of extension members with each extension member disposed within the channel of each respective side rail adjacent the upper end thereof for slidable adjustable movement therein.

9. The independently adjustable ladder extensions of claim 8 wherein each extension member includes an l-shaped eave catch for engaging an eave of a pitched roof for supporting the ladder thereagainst.

10. A pair of independently adjustable ladder extensions for leveling a ladder on a ground surface with the ladder having opposed side rails and each side rail having a channel, a plurality of through holes and a plurality of rungs interconnecting the side rails, each ladder extension, comprising:

a support leg disposed within the channel of the respective side rail for slidable adjustable movement therein;

locking means for locking the support leg in position after slidable adjustment within the respective channel and for releasing the support leg so that the support leg can be readjusted and repositioned within the channel of the respective side rail;

the locking means including a locking pin for insertion into and through the side rail and the support leg for locking the support leg in position and for removal therefrom so that the support leg can be readjusted and repositioned;

the locking pin including a shaft and a bendable flap member attached to the shaft and which is pressed against the shaft for facilitating the insertion and removal of the locking pin;

a pair of base members with each base member mounted to each support leg and each base member including one pair of base through holes extending completely through the base member and at right angles with respect to each other;

a pair of traction feet with each traction foot pivotally and rotatably mountable to each respective base member for stabilizing and leveling the ladder on the ground surface; and whereupon after each support leg is adjusted and positioned within the channel of the respective side rail the flap member is pressed against the shaft to allow for insertion of the locking pin into and through the side rail and the support leg and then the flap member is bent away from the shaft for preventing the withdrawal of the locking pin from the support leg and side rail resulting in the support leg being locked in position to the side rail.

11. The independently adjustable ladder extensions of claim 10 further comprising a pair of l-shaped eave catches with each eave catch attached to each respective extension member so that each eave catch can engage an eave of a pitched roof of a structure for supporting the ladder thereagainst.

12. A pair of independently adjustable ladder extensions for leveling a ladder on a ground surface with the ladder having opposed side rails and each side rail having a channel, an upper end and a lower end, a plurality of through holes and a plurality of rungs for interconnecting the side rails, each ladder extension, comprising:

a support leg disposed within the channel of the respective side rail for slidable adjustable movement therein;

locking means for locking the support leg in position after slidable adjustment within the respective channel and for releasing the support leg so that the support leg can be readjusted and repositioned within the channel of the respective side rail;

the locking means including a locking pin for insertion into and through the side rail and the support leg for locking the support leg in position and for removal therefrom so that the support leg can be readjusted and repositioned;

the locking pin including a shaft and a bendable flap member attached to the shaft and which is pressed against the shaft for facilitating the insertion and removal of the locking pin;

a pair of base members with each base member mounted to each support leg and each base member including one pair of base through holes extending completely through the base member and at right angles with respect to each other;

a pair of traction feet with each traction foot mounted to each respective base member for both pivotal movement and rotatable adjustment thereon to facilitate the leveling of the ladder on the ground surface;

a pair of l-shaped eave catches with each eave catch disposed at the upper end of each respective side rail for engaging an eave of a pitched roof of a structure for supporting the ladder thereagainst; and whereupon after each support leg is adjusted and positioned within the channel of the respective side rail the flap member of each locking pin is pressed against the shaft to allow for insertion of the shaft into and through the respective side rail and support leg and then the flap member is bent away from the shaft for preventing the withdrawal of the locking pin from the support leg and the side rail and resulting in the support leg being locked in position to the side rail.

13. The independently adjustable ladder extensions of claim 12 wherein each traction foot has a width of three inches and a length of six inches.

* * * * *